(12) United States Patent
Moon

(10) Patent No.: US 10,668,888 B2
(45) Date of Patent: Jun. 2, 2020

(54) CURTAIN AIRBAG APPARATUS

(71) Applicant: HYUNDAI MOBIS CO., LTD., Seoul (KR)

(72) Inventor: Geon Woong Moon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 30 days.

(21) Appl. No.: 16/001,292

(22) Filed: Jun. 6, 2018

(65) Prior Publication Data

US 2018/0354448 A1    Dec. 13, 2018

(30) Foreign Application Priority Data

Jun. 8, 2017    (KR) .................. 10-2017-0071516

(51) Int. Cl.
| | | |
|---|---|---|
| *B60R 21/233* | (2006.01) | |
| *B60R 21/232* | (2011.01) | |
| *B60R 21/2338* | (2011.01) | |
| *B60R 21/00* | (2006.01) | |

(52) U.S. Cl.
CPC .......... *B60R 21/233* (2013.01); *B60R 21/232* (2013.01); *B60R 21/2338* (2013.01); *B60R 2021/0009* (2013.01); *B60R 2021/23308* (2013.01); *B60R 2021/23386* (2013.01)

(58) Field of Classification Search
CPC .. B60R 21/233; B60R 21/232; B60R 21/2338
See application file for complete search history.

(56) References Cited

U.S. PATENT DOCUMENTS

| | | | | |
|---|---|---|---|---|
| 7,828,322 B2* | 11/2010 | Breuninger | ........... | B60R 21/231 |
| | | | | 280/730.2 |
| 8,789,846 B2* | 7/2014 | Wipasuramonton | ........................ | |
| | | | | B60R 21/232 |
| | | | | 280/730.2 |
| 8,967,660 B2* | 3/2015 | Taguchi | ................ | B60R 21/233 |
| | | | | 280/729 |
| 9,114,777 B2* | 8/2015 | Fukawatase | .......... | B60R 21/232 |
| 9,272,682 B2* | 3/2016 | Wang | .................... | B60R 21/232 |

(Continued)

FOREIGN PATENT DOCUMENTS

| | | | | | |
|---|---|---|---|---|---|
| JP | 2017119498 A | * | 7/2017 | ........... | B60R 21/232 |
| JP | 6274078 B2 | * | 2/2018 | | |
| WO | WO-2017171334 A1 | * | 10/2017 | ........... | B60R 21/013 |

*Primary Examiner* — Nicole T Verley
(74) *Attorney, Agent, or Firm* — Knobbe Martens Olson & Bear LLP

(57) ABSTRACT

A curtain airbag apparatus may include: a curtain airbag cushion part installed at a side of a vehicle, and expanded and deployed to cover the side of the vehicle; a first seaming part disposed in the curtain airbag cushion part at one side of a driver airbag cushion part, suppressing a thickness-direction expansion of the curtain airbag cushion part when the curtain airbag cushion parts is expanded, forming a constraint concave portion into which one side of the driver airbag cushion part is inserted, and forming first and second chamber parts at both sides of the constraint concave portion; a protruding chamber part expanded and deployed to the interior of the vehicle when the curtain airbag cushion part is expanded; and an anti-expansion tether part connected to both sides of the protruding chamber part, and restricting an expansion of the outside of the protruding chamber part.

8 Claims, 10 Drawing Sheets

(56) References Cited

U.S. PATENT DOCUMENTS

| | | | |
|---|---|---|---|
| 9,701,272 B2* | 7/2017 | Massa | B60R 21/213 |
| 9,713,999 B2* | 7/2017 | Kwon | B60R 21/232 |
| 9,771,046 B2* | 9/2017 | Lee | B60R 21/232 |
| 9,776,593 B2* | 10/2017 | Je | B60R 21/232 |
| 9,802,567 B2* | 10/2017 | Oh | B60R 21/23138 |
| 9,919,675 B2* | 3/2018 | Kim | B60R 21/232 |
| 9,994,186 B2* | 6/2018 | Fukawatase | B60R 21/232 |
| 10,017,146 B2* | 7/2018 | Sugimori | B60R 21/232 |
| 10,023,148 B2* | 7/2018 | Choi | B60R 21/16 |
| 10,106,119 B2* | 10/2018 | Oh | B60R 21/21 |
| 10,293,776 B2* | 5/2019 | Ohno | B60R 21/213 |
| 2010/0252350 A1* | 10/2010 | Hayashi | B60R 21/2338 180/274 |
| 2015/0145234 A1* | 5/2015 | Wang | B60R 21/232 280/729 |
| 2016/0023626 A1* | 1/2016 | Hiruta | B60R 21/232 280/728.2 |
| 2016/0059816 A1* | 3/2016 | Je | B60R 21/232 280/730.2 |
| 2016/0107599 A1* | 4/2016 | Lee | B60R 21/232 280/730.2 |
| 2016/0229370 A1* | 8/2016 | Hampson | B60R 21/232 |
| 2017/0166158 A1* | 6/2017 | Oh | B60R 21/23138 |
| 2017/0182966 A1* | 6/2017 | Choi | B60R 21/232 |
| 2019/0161051 A1* | 5/2019 | Gwon | B60R 21/235 |

* cited by examiner

CURTAIN AIRBAG APPARATUS

CROSS-REFERENCES TO RELATED APPLICATIONS

The present application claims priority to Korean application number 10-2017-0071516, filed on Jun. 8, 2017, which is incorporated by reference in its entirety.

BACKGROUND OF THE INVENTION

The present invention relates to a curtain airbag apparatus, and more particularly, to a curtain airbag apparatus capable of preventing a passenger's head from turning in case of an oblique collision of a vehicle.

In general, a vehicle has an airbag installed to protect a passenger. The airbag is installed at various positions depending on body parts which need to be protected. Curtain airbags are installed at both sides of the vehicle, and a steering wheel has a driver airbag installed therein.

When an oblique collision of the vehicle occurs, gas is injected into the curtain airbags and the driver airbag. The curtain airbags are expanded and deployed to cover the sides of the vehicle, and the driver airbag is expanded and deployed to cover the front of a driver. The driver airbag is pressed against one of the curtain airbags.

In the related art, however, the head of the driver may collide with a part between the driver airbag and the curtain airbag in case of an oblique collision. In this case, as the driver airbag is pushed and moved forward by the curtain airbag, the head of the driver is turned to collide with the part. Furthermore, in case of the oblique collision of the vehicle, the head of the passenger is moved forward while coming in contact with the curtain airbag. Therefore, the head is moved while being turned by friction of the curtain airbag. When the head of the driver is turned and then collide with the part, the level of brain damage may be increased. Therefore, there is a demand for a structure capable of solving the problem.

SUMMARY OF THE INVENTION

Embodiments of the present invention are directed to a curtain airbag apparatus capable of preventing a passenger's head from turning in case of an oblique collision of a vehicle.

In one embodiment, a curtain airbag apparatus may include: a curtain airbag cushion part installed at a side of a vehicle, and expanded and deployed to cover the side of the vehicle, as gas is injected; a first seaming part disposed in the curtain airbag cushion part at one side of a driver airbag cushion part, suppressing a thickness-direction expansion of the curtain airbag cushion part when the curtain airbag cushion part is expanded, forming a constraint concave portion into which one side of the driver airbag cushion part is inserted, and forming first and second chamber parts at both sides of the constraint concave portion so as to support the one side of the driver airbag cushion part; a protruding chamber part folded and installed in the second chamber part, and expanded and deployed to the interior of the vehicle from the rear of the driver airbag cushion part when the curtain airbag cushion part is expanded; and an anti-expansion tether part connected to both sides of the protruding chamber part, and restricting an expansion of the outside of the protruding chamber part when the protruding chamber part is deployed.

The protruding chamber part may be supported by the rear of the driver airbag cushion part.

Both sides of the anti-expansion tether part may be sewed to both sides of the protruding chamber part through a sewed part, after the protruding chamber part is folded.

The protruding chamber part may have a shape-retention seaming part formed at both sides thereof, and the sewed part may be sewed to the shape-retention seaming part.

The curtain airbag apparatus may further include a second seaming part formed at the rear of the protruding chamber part so as to limit an expansion thickness of the second chamber part.

The second seaming part may be disposed between the second chamber part and a third chamber part.

The anti-expansion tether part may be disposed in the center of the curtain airbag cushion part in a top-to-bottom direction.

The anti-expansion tether part may be disposed between the first seaming part and the second chamber part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
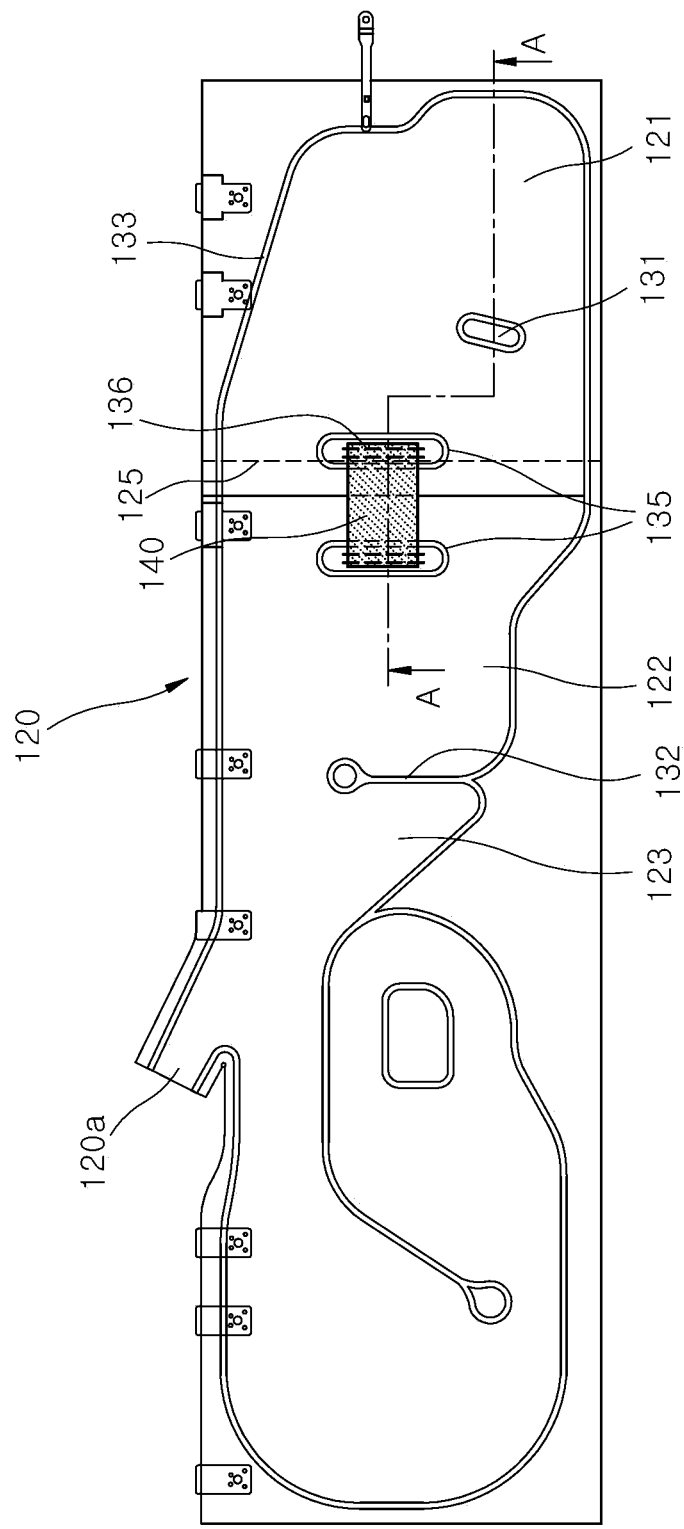
FIG. 1 illustrates that a curtain airbag apparatus in accordance with an embodiment of the present invention is deployed.
Figure 2:
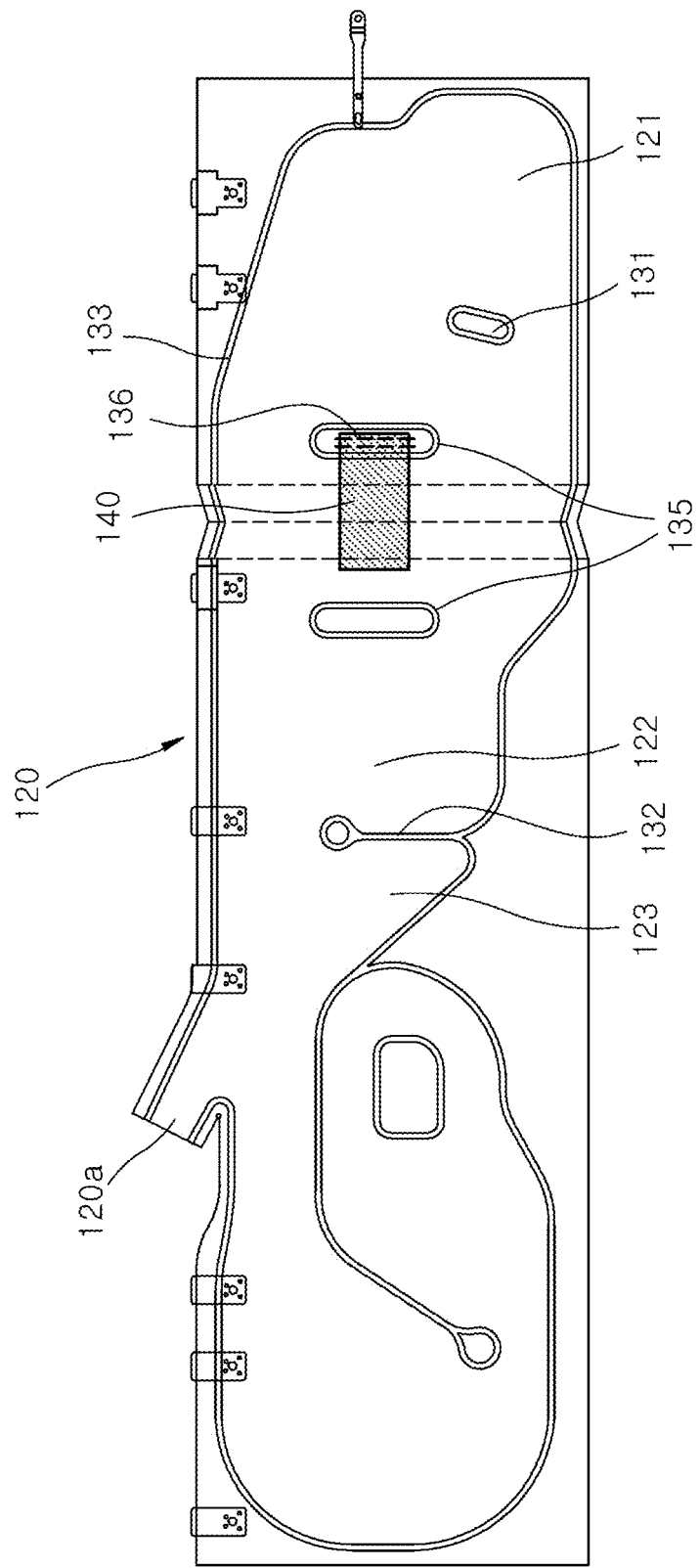
FIG. 2 illustrates a state before a protruding chamber part is folded in the curtain airbag apparatus in accordance with the embodiment of the present invention.
Figure 3:
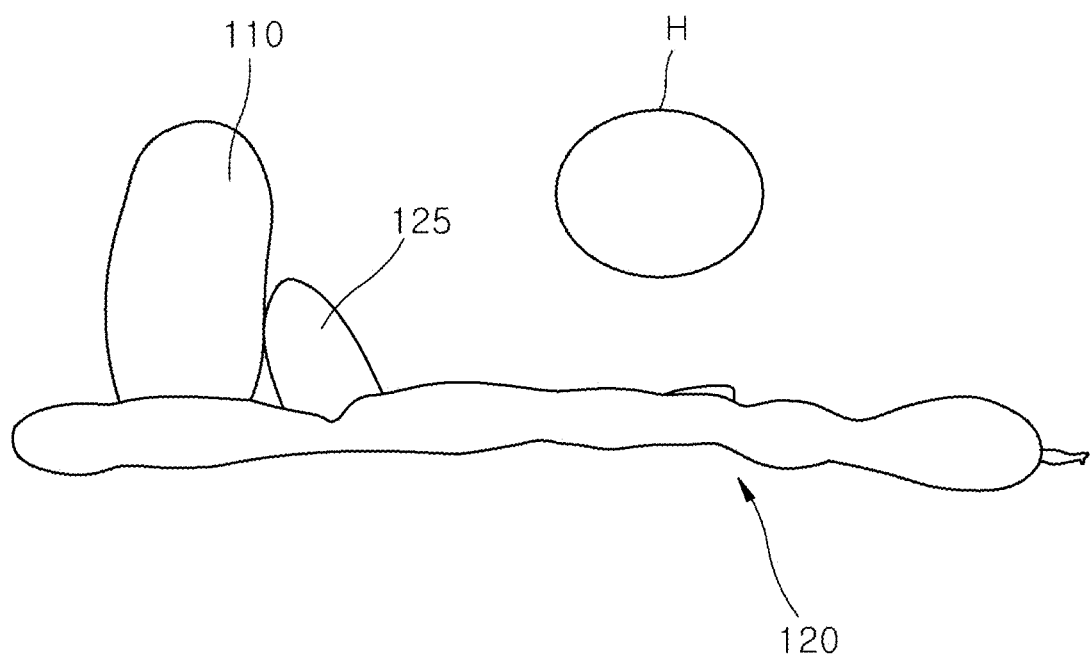
FIG. 3 is a plan view illustrating that the curtain airbag apparatus in accordance with the embodiment of the present invention is expanded.
Figure 4:
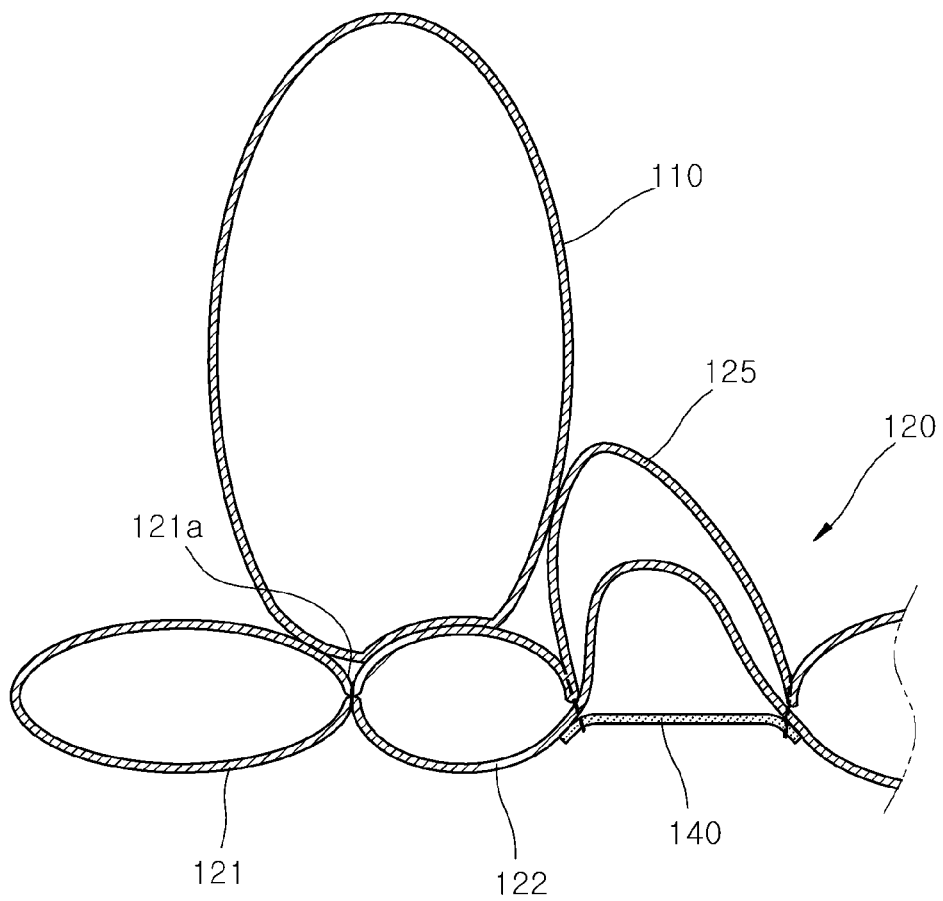
FIG. 4 is cross-sectional view illustrating that the protruding chamber part is expanded in the curtain airbag apparatus in accordance with the embodiment of the present invention.
Figure 5:
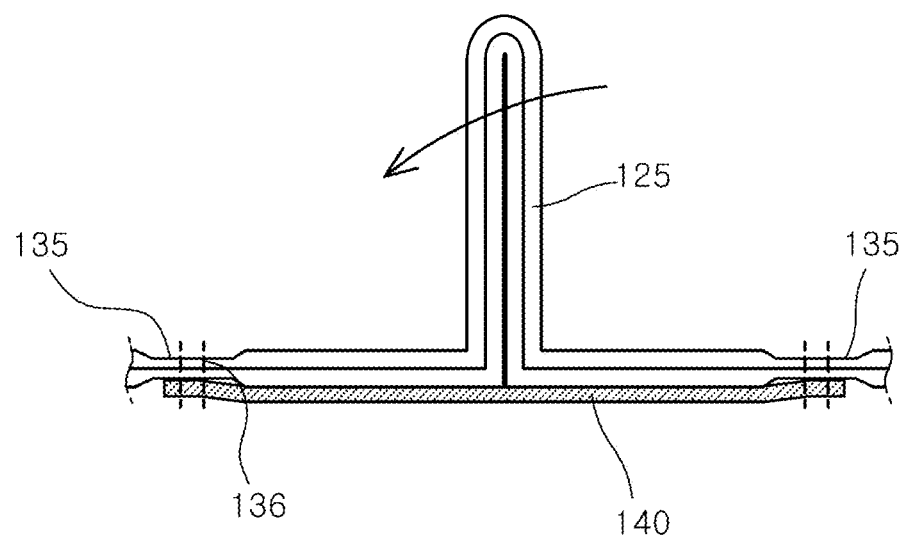
FIG. 5 is cross-sectional view illustrating that the protruding chamber part is folded in the curtain airbag apparatus in accordance with the embodiment of the present invention.
Figure 6:
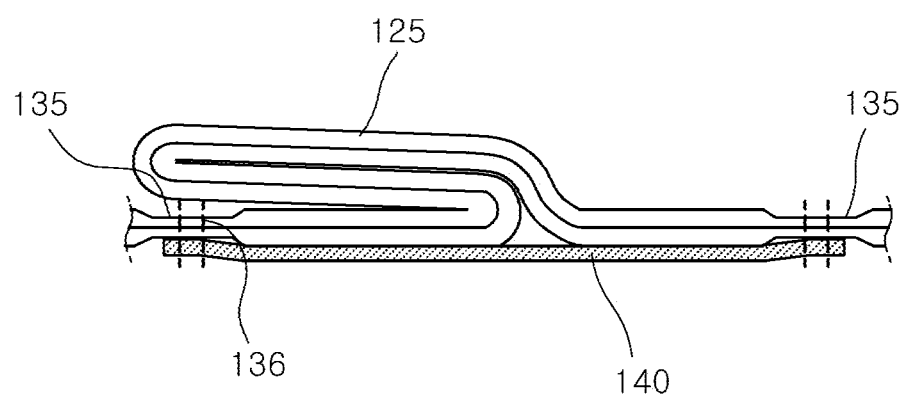
FIG. 6 is a cross-sectional view illustrating that the protruding chamber part is completely folded in the curtain airbag apparatus in accordance with the embodiment of the present invention.
Figure 7:
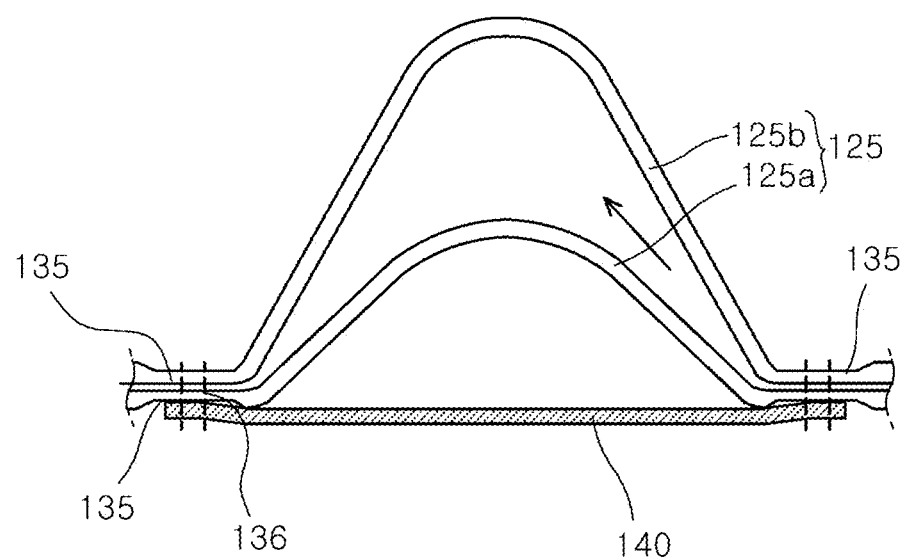
FIG. 7 is a cross-sectional view illustrating that the protruding chamber part is expanded in the curtain airbag apparatus in accordance with the embodiment of the present invention.

FIG. 1 illustrates that a curtain airbag apparatus in accordance with an embodiment of the present invention is deployed, FIG. 2 illustrates a state before a protruding chamber part is folded in the curtain airbag apparatus in accordance with the embodiment of the present invention, FIG. 3 is a plan view illustrating that the curtain airbag apparatus in accordance with the embodiment of the present invention is expanded, FIG. 4 is cross-sectional view illustrating that the protruding chamber part is expanded in the curtain airbag apparatus in accordance with the embodiment of the present invention, FIG. 5 is cross-sectional view illustrating that the protruding chamber part is folded in the curtain airbag apparatus in accordance with the embodiment of the present invention, FIG. 6 is a cross-sectional view illustrating that the protruding chamber part is completely folded in the curtain airbag apparatus in accordance with the embodiment of the present invention, and FIG. 7 is a cross-sectional view illustrating that the protruding chamber part is expanded in the curtain airbag apparatus in accordance with the embodiment of the present invention.

Referring to FIGS. 1 to 7, the curtain airbag apparatus in accordance with the embodiment of the present invention may include a curtain airbag cushion part 120, a first seaming part 131, a protruding chamber part 125 and an anti-expansion tether part 140.

A driver airbag cushion part 110 may be installed in a steering wheel (not illustrated) of a vehicle. The driver airbag cushion part 110 may be expanded and deployed toward a driver in case of a collision of the vehicle. At this time, the driver airbag cushion part 110 may be deployed at the same time as the curtain airbag cushion part 120, or deployed with a slight time difference from the curtain airbag cushion part 120.

The curtain airbag cushion part 120 may be installed at each side of the vehicle. As gas is injected from an inflator (not illustrated), the curtain airbag cushion part 120 may be expanded and deployed to cover the corresponding side of the vehicle. At this time, the curtain airbag cushion part 120 may be wound and installed in a roof panel (not illustrated).

The curtain airbag cushion part 120 may have a connection portion 133 formed along sides thereof, the connection part 133 being formed through a sewing operation. The connection part 133 may seal the curtain airbag cushion part 120.

The first sealing part 131 may be disposed in the curtain airbag cushion part 120 at one side of the driver airbag cushion part 110. The first seaming part 131 may be formed by sewing overlapping fiber materials or bonding the overlapping fiber materials with an adhesive, when the curtain airbag cushion part 120 is manufactured.

The first seaming part 131 may suppress the curtain airbag cushion part 120 from expanding in the thickness direction thereof, when the curtain airbag cushion part 120 is expanded. At this time, the first seaming part 131 may form a constraint concave portion 121a into which one side of the expanded driver airbag cushion part 110 is inserted, and form first and second chamber parts 121 and 122 at both sides of the constraint concave portion 121a to support the one side (outside) of the driver airbag cushion part 110.

Since the one side of the driver airbag cushion part 110 is supported by the first chamber part 121 with the one side inserted into the constraint concave portion 121a, the driver airbag cushion part 110 can be prevented from being separated from the curtain airbag cushion part 120 or pushed and moved forward, even though the head H (refer to FIG. 3) of a passenger collides with a part between the driver airbag cushion part 110 and the curtain airbag cushion part 120 in case of an oblique collision of the vehicle. The oblique collision of the vehicle may indicate that the vehicle obliquely collides in a lateral direction of the vehicle at the front of the vehicle.

The protruding chamber part 125 is folded and installed in the second chamber part 122. At this time, the protruding chamber part 125 may be formed by overlapping inner and outer fibers 125a and 125b and folding the overlapped fibers toward the front or rear of the vehicle. The protruding chamber part 125 may be expanded and deployed to the interior of the vehicle from the rear of the driver airbag cushion part 111, when the curtain airbag cushion part 120 is expanded.

Since the protruding chamber part 125 is deployed to the interior to cover the space between the one side of the driver airbag cushion part 110 and the second chamber part 122, the head H of the passenger may collide with the protruding chamber part 125 in case of an oblique collision of the vehicle. At this time, the protruding chamber part 125 may support the head H of the passenger, the driver airbag cushion part 110 may support the protruding chamber part 125, and the one side of the driver airbag cushion part 110 may be inserted into the constraint concave portion 121a and prevented from being pushed and moved forward. Therefore, since the protruding chamber part 125 supports the head H of the passenger while stably holding the head H, a turn of the head H can be prevented. Furthermore, the head H of the passenger can be prevented from be turned by friction with the protruding chamber part 125.

Since the protruding chamber part 125 is supported by the rear of the driver airbag cushion part 110, a distance between the head H of the passenger and the protruding chamber part 125 may be relatively reduced. Therefore, in case of an oblique collision of the vehicle, the head H of the passenger may come in contact with the protruding chamber part 125 faster, which makes it possible to prevent a turn of the head H.

The anti-expansion tether part 140 may be connected to both sides of the folded protruding chamber part 125 in the front-to-rear direction thereof, and restrict an expansion of the outside of the protruding chamber part 125 when the protruding chamber part 125 is deployed. Since the anti-expansion tether part 140 restricts an expansion of the outside of the protruding chamber part 125, the protruding chamber part 125 may be deployed so as to protrude to the interior of the vehicle. Since the protruding chamber part 125 protrudes to the interior of the vehicle, the protruding chamber part 125 may block the gap between the one side of the driver airbag cushion part 110 and the second chamber part 122. The inner and outer fibers 125a and 125b constituting the protruding chamber part 125 may be separated from the anti-expansion tether part 140. Therefore, it is possible to prevent the head H of the passenger from entering the constraint concave portion 121a in case of an oblique collision of the vehicle.

The anti-expansion tether part 140 may be formed of a fiber band woven with fiber yarn or a material with no elasticity. The anti-expansion tether part 140 may be disposed in the center of the curtain airbag cushion part 120 in the top-to-bottom direction thereof. The anti-expansion tether part 140 may be disposed between the first seaming part 131 and the second chamber part 122.

Both sides of the anti-expansion tether part 140 may be sewed to both sides of the protruding chamber part 125 through a sewed part 136, after the protruding chamber part 125 is folded. At this time, the anti-expansion tether part 140 may be disposed in the front-to-rear direction of the vehicle, and the sewed part 136 may be formed at both sides of the anti-expansion tether part 140 in the top-to-bottom direction.

The protruding chamber part 125 has a shape-retention seaming part 135 formed at both sides thereof, and the sewed part 136 is sewed to the shape-retention seaming part 135. The shape-retention seaming part 135 may limit the widthwise expansion thickness of the second chamber part 122. Since the shape-retention seaming part 135 limits the widthwise thickness of the second chamber part 122 and the anti-expansion tether part 140 restricts an expansion of the outside of the second chamber part 122, the protruding chamber part 125 may be deployed so as to protrude to the interior of the vehicle.

The curtain airbag apparatus may further include a second seaming part 132 which is formed at the rear of the protruding chamber part 125 so as to limit the expansion thickness of the second chamber part 122. The second seaming part 132 may be disposed between the second and third chamber parts 122 and 123. Since the second seaming part 132 limits the expansion thickness of the second chamber part 122, the internal pressure of the protruding chamber part 125 may be increased.

The operation of the curtain airbag apparatus in accordance with the embodiment of the present invention will be described.

Figure 8:
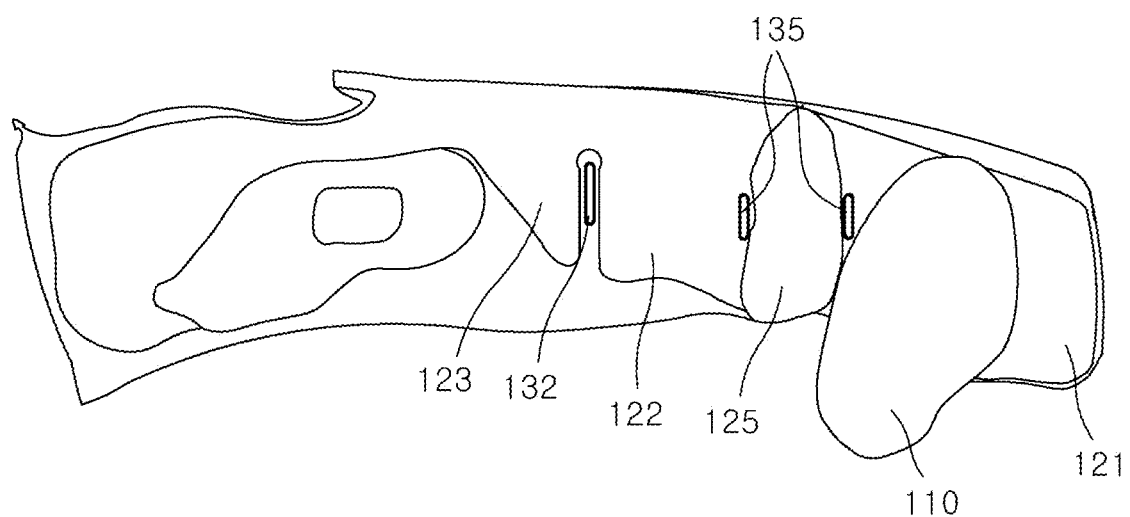
FIG. 8 is a front view illustrating that the curtain airbag apparatus in accordance with the embodiment of the present invention is expanded.
Figure 9:
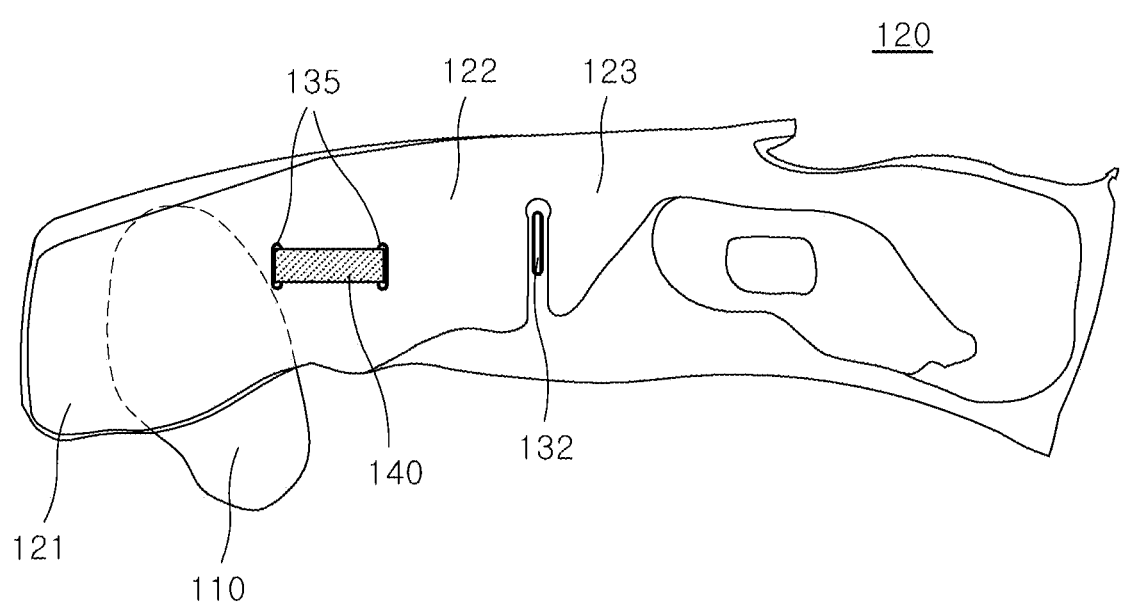
FIG. 9 is a rear view illustrating that the curtain airbag apparatus in accordance with the embodiment of the present invention is expanded.
Figure 10:
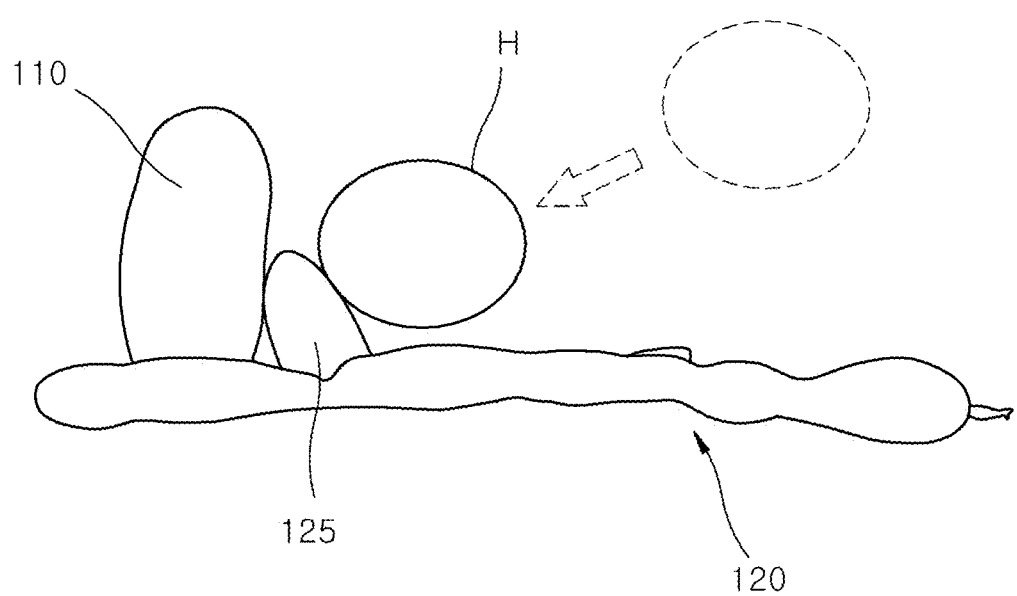
FIG. 10 is a rear view illustrating that the head of a passenger collides with the protruding chamber part in the curtain airbag apparatus in accordance with the embodiment of the present invention, in case of an oblique collision of a vehicle.

FIG. 8 is a front view illustrating that the curtain airbag apparatus in accordance with the embodiment of the present invention is expanded, FIG. 9 is a rear view illustrating that the curtain airbag apparatus in accordance with the embodiment of the present invention is expanded, and FIG. 10 is a rear view illustrating that the head of a passenger collides with the protruding chamber part in the curtain airbag apparatus in accordance with the embodiment of the present invention, in case of an oblique collision of a vehicle.

Referring to FIGS. 8 to 10, the driver airbag cushion part 140 and the curtain airbag cushion part 120 may be expanded and deployed almost at the same time, in case of an oblique collision of the vehicle.

At this time, when the curtain airbag cushion part 120 is expanded and deployed, the first and second seaming parts 131 and 132 may limit the expansion thickness of the curtain airbag cushion part 120. The constraint concave portion 121a may be formed around the first seaming part 131, and one side of the driving airbag cushion part 110 may be inserted into the constraint concave portion 121a. The first chamber part 121 may be convexly expanded at the front of the first seaming part 131, and support the driver airbag cushion part 110 inserted into the constraint concave portion 121a.

When the second chamber part 122 and the protruding chamber part 125 are deployed, the anti-expansion tether part 140 may restrict an expansion of the inside of the protruding chamber part 125. Therefore, the protruding chamber part 125 may be deployed to support the rear of the driver airbag cushion part 110. The protruding chamber part 125 may block the gap between the outside of the driver airbag cushion part 110 and the second chamber part 122.

Since the one side of the driver airbag cushion part 110 is supported by the first chamber part 121 with the one side inserted into the constraint concave portion 121a and the protruding chamber part 125 blocks the gap between the outside of the driver airbag cushion part 110 and the second chamber part 122, the head H of the passenger may collide with the protruding chamber part 125 in case of an oblique collision of the vehicle. Therefore, since the head H of the passenger is rubbed against the protruding chamber part 125 while being supported by the protruding chamber part 125, a turn of the head H can be prevented.

Since the protruding chamber part 125 is supported by the driver airbag cushion part 110 and the one side of the driver airbag cushion part 110 is inserted into the constraint concave portion 121a, the driver airbag cushion part 110 can be prevented from being separated from the curtain airbag cushion part 120 or pushed and moved forward by the load of the head H. Therefore, since the driver airbag cushion part 110 and the curtain airbag cushion part 120 stably support the head H of the passenger, the head H of the passenger can be prevented from being turned and colliding.

Since the protruding chamber part 125 is deployed to the interior to cover the space between the one side of the driver airbag cushion part 110 and the second chamber part 122, the head H of the passenger may collide with the protruding chamber part 125 in case of an oblique collision of the vehicle. Therefore, while the head H of the passenger is supported by the protruding chamber part 125, a turn of the head H can be prevented.

Furthermore, since the protruding chamber part 125 supports the head H of the passenger, the driver airbag cushion part 110 supports the protruding chamber part 125, and the one side of the driver airbag cushion part 110 is inserted into the constraint concave portion 121a, the driver airbag cushion part 110 can be prevented from being pushed forward and separated from the curtain airbag cushion part 120 by a collision load of the head H.

Furthermore, since the shape-retention seaming part 135 limits the widthwise thickness of the second chamber part 122 and the anti-expansion tether part 140 restricts an expansion of the outside of the protruding chamber part 125, the protruding chamber part 125 may be deployed so as to protrude to the interior of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A curtain airbag apparatus comprising:
   a curtain airbag cushion installed at a side of a vehicle, and configured to expand and deploy to cover the side of the vehicle, as gas is injected;
   a first seam disposed in the curtain airbag cushion, wherein the curtain airbag cushion comprises a first chamber portion and a second chamber portion with respect to the first seam such that the first seam is located between the first and second chamber portions, wherein, when the first and second chamber portions of the curtain airbag cushion expand, the first seam is configured to suppress expansion in a thickness-direction of the curtain airbag cushion and further configured to form a constraint concave portion between the first chamber portion and the second chamber portion, wherein the constraint concave portion is configured to receive one side of a driver airbag cushion to limit movement of the driver airbag cushion;
   a protruding chamber folded and installed in the curtain airbag cushion, wherein the protruding chamber being configured to expand and deploy expanded and deployed to the interior of the vehicle, wherein, when deployed, the protruding chamber is located in the rear of the driver airbag cushion such that the constraint concave portion is located between the first chamber portion and the protruding chamber; and an anti-expansion tether connected to both sides of the protruding chamber, wherein the anti-expansion tether is configured to restrict an expansion of the protruding chamber when the protruding chamber is deployed.

2. The curtain airbag apparatus of claim 1, wherein the protruding chamber is supported by the rear of the driver airbag cushion.

3. The curtain airbag apparatus of claim 1, wherein both sides of the anti-expansion tether are sewed to both sides of the protruding chamber.

4. The curtain airbag apparatus of claim 3, wherein the protruding chamber has a shape-retention seam formed at both sides thereof, and the sewed part is sewed to the shape-retention seam.

5. The curtain airbag apparatus of claim 4, further comprising a second seam formed at the rear of the protruding chamber so as to limit an expansion thickness of the second chamber portion.

6. The curtain airbag apparatus of claim 5, wherein the second seam is disposed between the second chamber portion and a third chamber portion.

7. The curtain airbag apparatus of claim 3, wherein the anti-expansion tether is disposed in the center of the curtain airbag cushion in a top-to-bottom direction.

8. The curtain airbag apparatus of claim 7, wherein the anti-expansion tether is disposed between the first seam and the second chamber portion.

\* \* \* \* \*